Nov. 29, 1960    F. B. HATEBUR    2,961,742
METHOD AND APPARATUS FOR DESCALING HEATED BAR OR WIRE STOCK
Filed July 6, 1956    5 Sheets-Sheet 1

INVENTOR
Friedrich B. Hatebur
BY
ATTORNEYS

Nov. 29, 1960  F. B. HATEBUR  2,961,742
METHOD AND APPARATUS FOR DESCALING HEATED BAR OR WIRE STOCK
Filed July 6, 1956  5 Sheets-Sheet 3
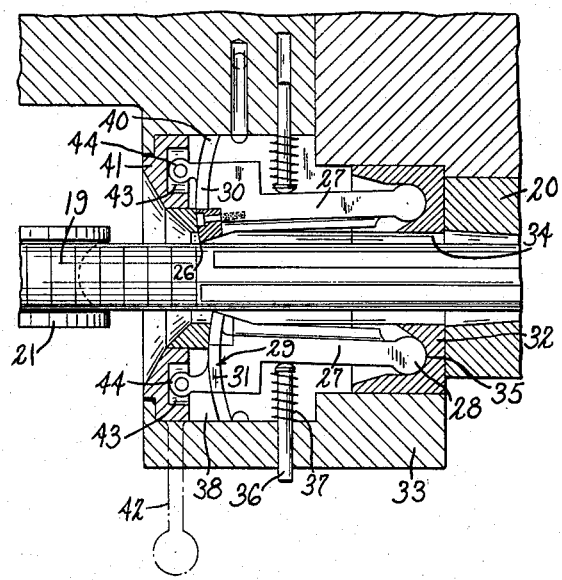
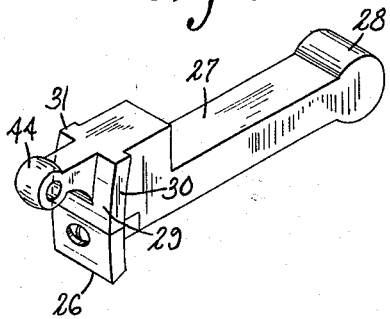
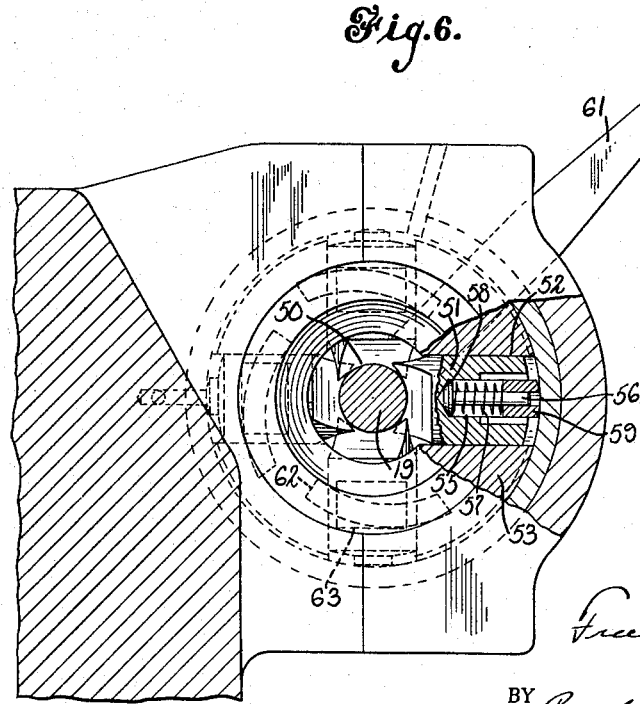
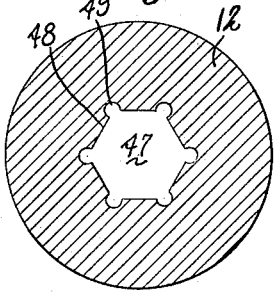
INVENTOR
Friedrich B. Hatebur
BY Rockwell Bartholow
ATTORNEYS Nov. 29, 1960 F. B. HATEBUR 2,961,742
METHOD AND APPARATUS FOR DESCALING HEATED BAR OR WIRE STOCK
Filed July 6, 1956 5 Sheets-Sheet 4
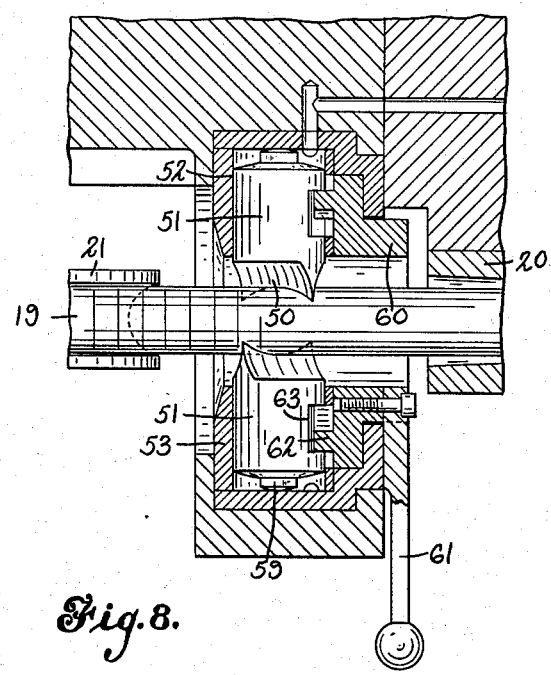
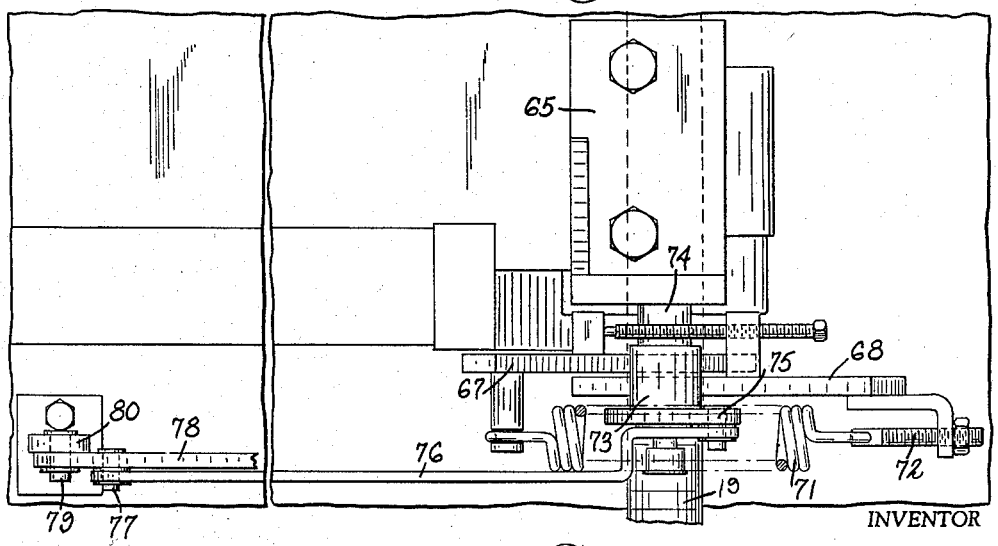
INVENTOR
Friedrich B. Hatebur
BY Rockwell Bartholow
ATTORNEYS Nov. 29, 1960 F. B. HATEBUR 2,961,742
METHOD AND APPARATUS FOR DESCALING HEATED BAR OR WIRE STOCK
Filed July 6, 1956 5 Sheets-Sheet 5

INVENTOR
Friedrich B. Hatebur
BY Rockwell & Bartholow
ATTORNEYS

United States Patent Office 2,961,742
Patented Nov. 29, 1960

2,961,742

METHOD AND APPARATUS FOR DESCALING HEATED BAR OR WIRE STOCK

Friedrich Bernhard Hatebur, Postbox Basel 2, Switzerland

Filed July 6, 1956, Ser. No. 596,171

3 Claims. (Cl. 29—81)

In the processing of various articles from hot metal bar, rod or wire stock, difficulty is encountered on account of the scale which appears on the outside of the stock when heated. This is particularly true, for example, in making such articles as bolts or nuts in which process a workpiece is usually cut from a length of stock, and this workpiece then processed in one or more forming dies, the workpiece or blank being carried or transferred from one die to another. If the length of stock is heated so that the product is formed by a "hot" process instead of a "cold" process the dies are deleteriously affected by the scale which appears on the outer surface of the stock when it is heated.

This scale results in the rapid deterioration and wearing out of the dies which adds greatly to the cost of the process in that the manufacture of new dies incurs considerable expense.

It is contemplated by the present invention to strip or scrape the scale from the heated bars, or at least a part of this scale, prior to the forming operations in such a manner that only scale-free surfaces of the workpiece will come in contact with the walls of the die, thus rendering the forming or processing of the work easier and less expensive, particularly as to die cost.

As illustrated, the present method of descaling the work comprises placing descalers or scrapers in such a position as to embrace the length of stock as it is being fed to the machine. Usually this stock is fed to a cut-off mechanism by which a certain length is severed from the bar or rod to serve as the workpiece, and this length is carried to the processing stations of the machine.

As illustrated the descaling or scraping devices are placed between the feeding mechanism, in this instance feed rolls, and the cut-off device so that the cut-off mechanism severs the workpiece in its descaled form, which workpiece is then carried to the processing stations of the machine.

In some instances the descaling may be effected in strips extending axially or lengthwise of the length of stock so that a certain amount of scale may be left upon the workpiece between those strips. If the scale remaining on the workpiece is found to be harmful, the first die in which the forming of the blank is effected may be provided with recesses or the like in which the scale may drop, thus providing relieved areas for receiving the scale so that it will not harmfully affect the die.

One object of the invention is to provide a method of descaling the work in the processing of hot metal bar, wire or rod stock so that the scale which results from the heating of the stock will not deleteriously affect the dies of the processing machine.

A further object of the invention is to provide a method of removing scale from the outer surface of heated bar or rod stock as this stock is being fed to a machine for processing, the scale being removed between the feeding mechanism and the severing mechanism which ordinarily severs a workpiece from the length of stock.

A still further object of the invention is to provide an apparatus disposed between the feed mechanism and the cut-off mechanism of a machine for processing hot metal bar, rod or wire stock for scraping or stripping the scale from a heated metal bar, wire or rod being fed to the machine.

Still another object of the invention is to provide a machine for the hot processing of metal bar, wire or rod stock having cut-off mechanism for cutting a workpiece from the length of stock and feed mechanism for feeding the length of stock to the cut-off mechanism with stripping or scraping means located between the cut-off and feeding mechanism to strip scale from the outer surface of the stock.

To these and other ends the invention consists in the novel features and combinations of parts to be hereinafter described and claimed.

In the accompanying drawings:

Fig. 4 is a sectional view on line 4—4 of Fig. 3;

Fig. 5 is a detail perspective view of one of the scraper or stripping members;

Fig. 6 is a view similar to Fig. 3 but showing a modified form of my invention;

Fig. 7 is a sectional view of the mechanism shown in Fig. 6, the section being taken at right angles to that of Fig. 6;

Fig. 8 is an enlarged top plan view of a further modified form of scraping mechanism;

Fig. 11 is a sectional view of the first forming die of the machine, the view being taken on line 11—11 on Fig. 1 but omitting the workpiece or blank.

Figure 1:
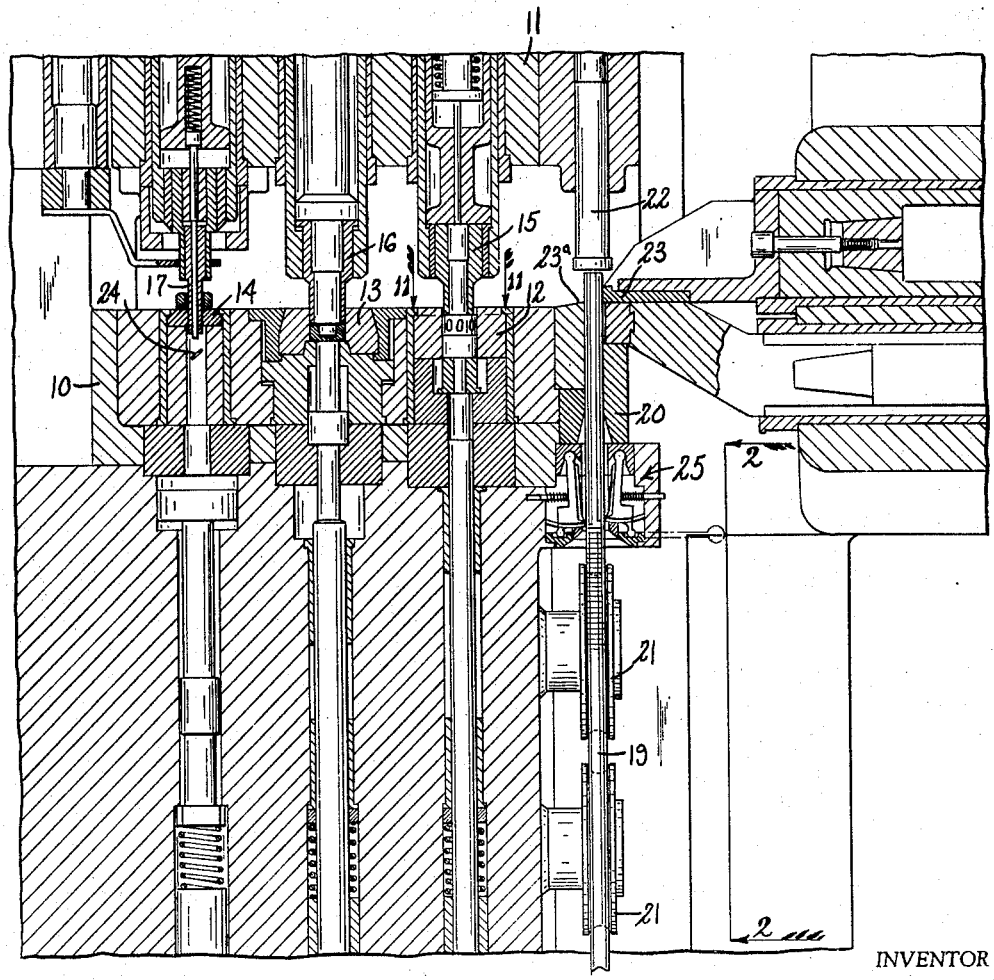
Fig. 1 is a horizontal sectional view of a metal-processing machine embodying my invention.

In Fig. 1 of the drawings there is illustrated a metal-forming machine such as a device for making nut blanks, for example, the machine comprising a die bed 10 and a gate 11. In the die bed are a plurality of dies such, for example, as the first forming die 12, a second forming die 13, and a piercing die 14.

It will be understood that the gate is adapted to reciprocate toward and from the die bed and the gate is provided with suitable forming tools such as the punches designated generally at 15, 16 and 17 for performing the various operations upon the workpiece.

Figure 2:
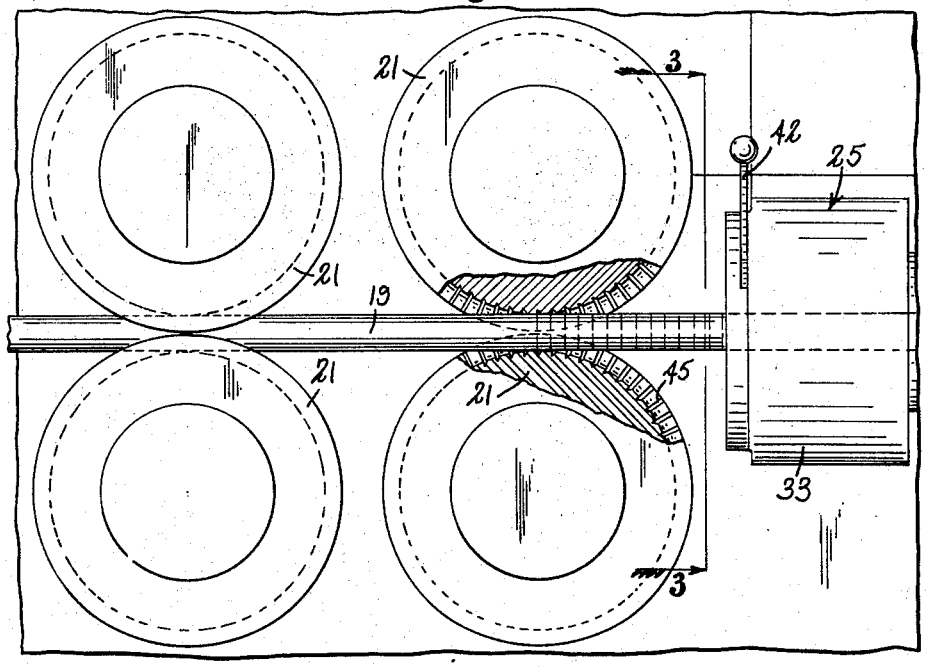
Fig. 2 is a side elevational view of certain parts of the machine, looking in the direction of the arrows 2—2 of Fig. 1, certain parts being broken away for the sake of clearness.

The work or stock in the form of a metal bar, rod or wire 19 is fed to the machine through a guide 20 by feed rolls 21, there being four of such rolls, as shown in Fig. 2, two above and two below the length of stock 19. It is understood that the work is heated prior to its engagement by the feed rolls, and this heating may be effected by any well-known means such as an induction heater, for example, it being unnecessary to illustrate it in the drawings.

After passing through the guide 20, the work is fed against a stop 22 and a length is severed from the length of stock by the knife 23 which is reciprocably mounted upon the machine and may be actuated by the usual means. A shear member 23ª cooperates with the knife in this operation. When a length of stock has been severed by the knife 23, it is carried by any suitable means, usually by the knife, to the first forming station where it is acted upon by the die 12 and punch mechanism 15 which enlarges the workpiece laterally, shortening its length and providing flat spots upon its sides if a hexagonal nut is to be the result of the operation. The workpiece is then transferred by any suitable transfer means to the next station where it is acted upon by the die 13 and punch mechanism 16, at which time the nut is further formed to true hexagonal shape and is heavily indented at its rear surface, leaving only a thin web at its center adjacent the front surface. The workpiece or blank is then transferred to the last or piercing station wherein the web just referred to is pierced from the blank by the punch 17 in the form of the slug 24 which is led from the machine in the usual manner.

In order for the cut-off blank to be free from scale while being processed, means are provided, as shown at 25 (Fig. 1) between the feed mechanism and the cut-off mechanism 23 to scrape or strip at least a substantial portion of the scale from the length of stock. This mechanism comprises a plurality of scraping or stripping members shown more particularly in Figs. 4 and 5, each of these members being provided with a scraping edge 26 provided upon an elongated shank 27 having a rounded or knuckle-like end portion 28. The edge 26, as shown more clearly in Fig. 5, is provided on a head 29 which projects outwardly from the shank at each side to provide guide flanges 30 and 31.

As shown in Fig. 4 a block 32 is mounted in the frame 33 of the machine, this block having an opening 34 to permit the passage of the stock therethrough, which opening registers with that in the guide 20. The member 32 is also provided with a plurality of rounded sockets 35 in which are pivotally mounted the rounded ends or knuckles 28 of the shanks 27 of the scraper elements so as to pivot the latter in the frame. These scraper or stripping members are urged toward the work or stock 19 by spring-pressed plungers 36 (Fig. 4) so that they will always be maintained in contact with the work. Springs 37 surround these plungers and, by acting against the heads thereof, urge them inwardly.

Figure 3:
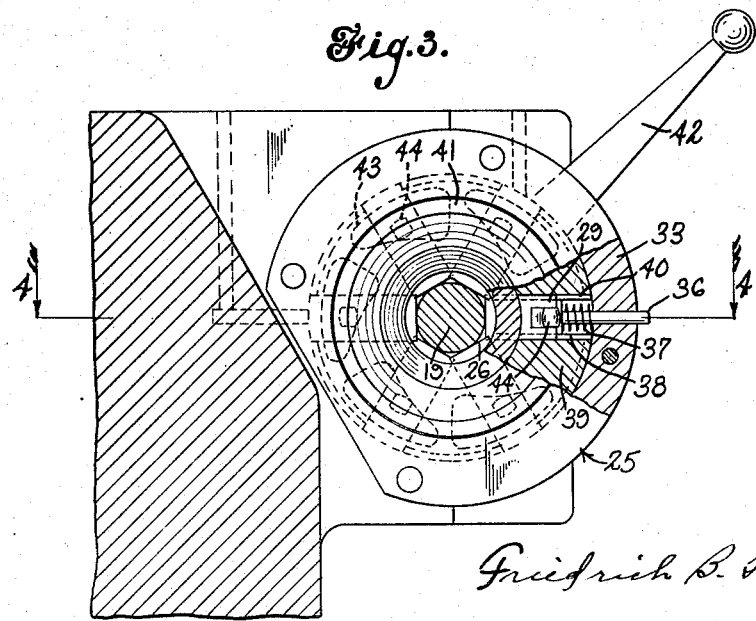
Fig. 3 is a sectional view on line 3—3 of Fig. 2.

As shown in Figs. 3 and 4, the shanks 27 of the knives vary in length to some extent so that their scraping edges 26 are set at varying lengths from the knuckles 28. For example, every alternate knife shank 27 may be slightly longer than the remaining so that the edges of the knives may overlap to a slight extent and thereby greater area of contact with the workpiece may be obtained than would otherwise be the case. If desired, the scraping edges of the knives may be slightly contoured to fit the curvature of the work. As shown more especially in Fig. 3, the block 32 is provided with radially formed passages 38 within which the scraper members are movably mounted, these passages being separated by partitions 39 of sector shape in cross section. Arcuate grooves 40 having their centers about the knuckles 28 are formed in the walls of the partitions 39, and the flanges 30 and 31 extend into and are guided in the grooves 40.

The pivoting of the scraper or stripping members permits them to be opened up readily to allow the work to be placed between them when a new bar or rod of stock is being supplied to the machine. These members may be moved outwardly by means of a rotating cam plate 41 rotatably mounted in the frame 33 and oscillated by means of the handle or lever 42. This plate is provided at its inner surface with a plurality of cam slots 43 in which are adapted to extend cam followers 44, one of which is provided on the forward end of each of the scraper members (Fig. 5).

As shown in Fig. 2 the feed rolls 21 are provided upon their active surfaces with transverse grooves 45 which serve to contact the outer surface of the stock and break up the scale leaves before the stock reaches the scraping or stripping mechanism. When a new bar is fed to the machine, as soon as it passes the feeding rolls, the lever 42 will be operated in a direction to cam the forward ends of the scraper members outwardly about their pivots 28 so as to permit the entry of the stock between the knives or scrapers. The knives are then permitted to be returned to a position against the stock under the force of the springs 37 and, as the stock is fed inwardly against the stop 22, the scale is stripped or scraped therefrom along the areas contacted by the scraper edges 26. These areas may be greater or less in width depending upon the contour of the scraping edges 26 and the diameter of the stock if round stock is being employed.

As shown in Fig. 11 the die at the first forming station may be provided with a die opening 47 having a number of flat sides 48 to form preliminary flat areas upon the work-piece at the station as a hexagonal nut is being produced. Between the flat sides 48 recessed or relieved areas 49 may be provided to allow the scale to drop into when the work-piece is processed at this station and flattened out and shortened in length. It will be understood that the areas scraped by the knives 26 and extending lengthwise of the piece of stock will contact the flattened areas 48 so that the die will not be engaged by the scale on the workpiece.

Therefore, at this first forming station the flat areas of the die are contacted by that part of the workpiece from which the scale has been scraped, and the scale which may have remained on the workpiece after the scraping operation is, by the upsetting of the workpiece at this station, broken off and is received in the relief recesses 49 and may be washed out afterwards with a stream of water. In this manner the flats of a nut such as a hexagonal nut are clean and free of scale when each succeeding workpiece is presented to the first forming station or prepressing operation.

It will be understood that the workpiece is fed against the stop 22 after passing through the descaling or scraping mechanism and a length is cut therefrom by the knife 23 as previously explained.

In Figs. 6 and 7 of the drawings I have shown a somewhat modified form of the scraping or stripping mechanism for removing the scale from the workpiece. In this instance scraping or stripping edges 50 are provided upon scraper members 51, these members being mounted in bores 52 in a block 53 secured in the frame 33 of the machine. The edges 50 are of spiral form so as to contact the piece of stock 19 over a considerable area.

As shown, there are four of the scraper members 51 although any desired number may be provided depending upon the shape of the finished article. Seated in a bore 55 in each of these members is a plunger 56 urged inwardly by a spring 57, which spring acts against the head 58 of the plunger at its inner end and against a block 59 at its outer end. The head 58 of the plunger seats against the bottom of the bore 55 and urges each of the scraper members 51 inwardly toward the work.

As shown in Fig. 7 a cam ring 60 is rotatably mounted in the frame and to this ring is secured a manipulating handle 61 by which the ring may be oscillated. On the face of this ring adjacent the scraper members 51 are a plurality of cam lugs 62 adapted to be received in recesses 63 in the members 51. The cam lugs 62 are spirally arranged so that on rotation of the ring 60 the members 51 are moved radially outward with respect to the workpiece 19 so that they may be opened up to permit reception of the workpiece. The action of the scraper mechanism shown in Figs. 6 and 7 is similar to that previously described with respect to the mechanism shown in Figs. 1 to 5 of the drawings.

Figure 9:
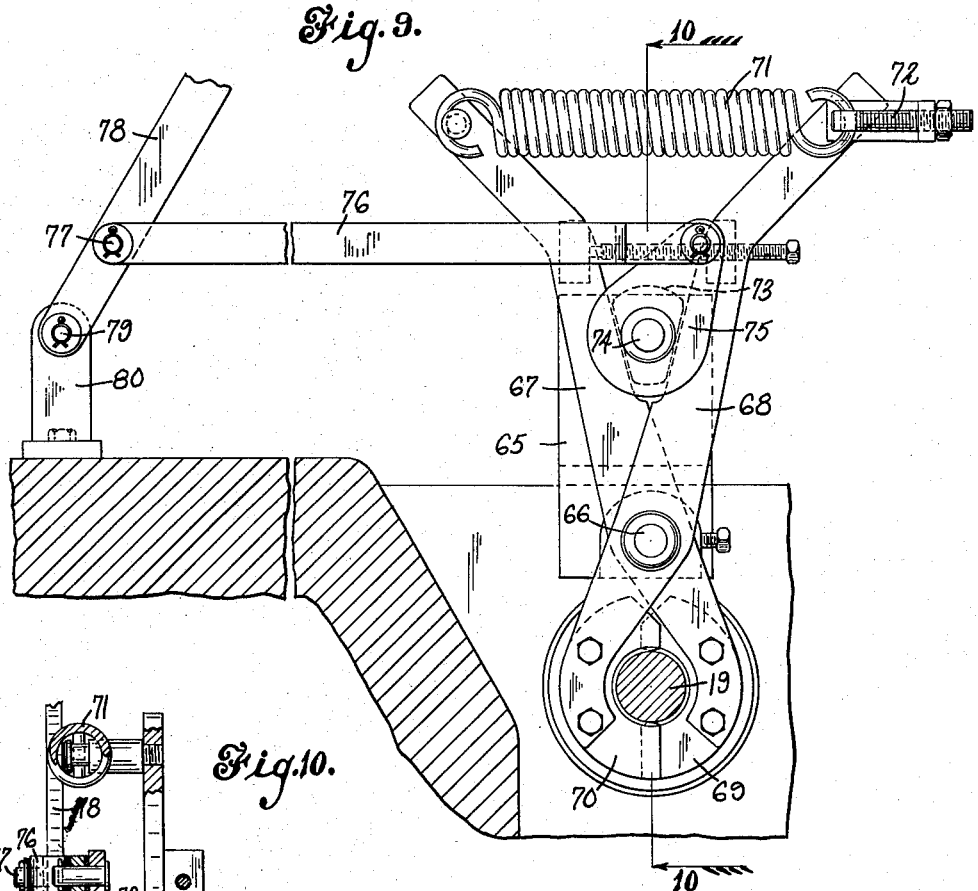
Fig. 9 is an elevational view, partly in section, of the mechanism shown in Fig. 8.
Figure 10:
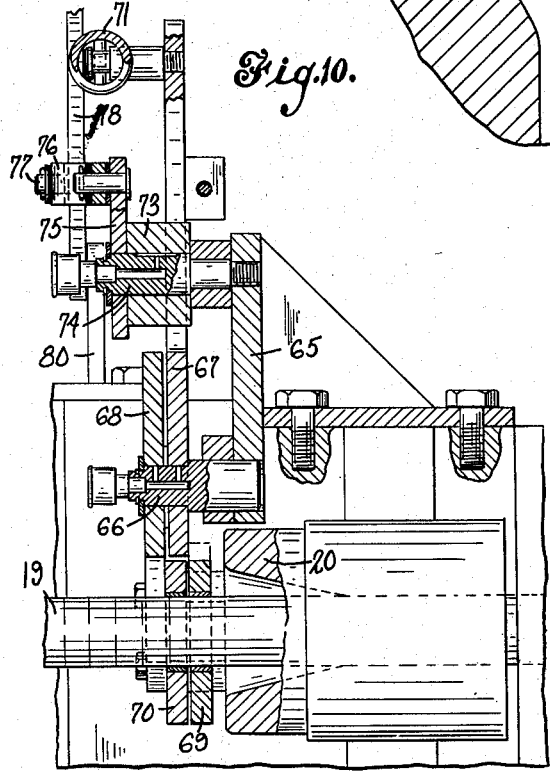
Fig. 10 is a sectional view on line 10—10 of Fig. 9.

A further modified form of scraper mechanism is shown in Figs. 8, 9 and 10 of the drawings. In this instance a bracket 65 is secured to the frame 33 of the machine, and to this bracket are pivoted at the point 66 arms 67 and 68 which at their lower ends carry scraping blades 69 and 70, these blades, as shown in Fig. 9, being of curved configuration on their opposing surfaces so as to embrace the length of bar stock 19 (Fig. 9). At their upper ends the levers 67 and 68 may be urged toward each other or in a direction to close the blades 69 and 70 by a tension spring 71 secured at its ends to the ends of the arms. Provision is made at 72 for adjustment of the tension of the spring.

In order that the blades 69 and 70 may be opened to permit the introduction of the workpiece therebetween, a cam member 73 is mounted between the arms 67 and 68 and pivoted at 74 to the frame member 65. To the member 73 is secured an arm 75 to which is pivoted one end of a link 76, the other end of this link being pivoted at 77 to an operating handle 78. This handle is pivoted at 79 to a bracket 80 carried by the frame 33.

When the handle 78 is moved toward the left or in a clockwise direction, as shown in Fig. 9, the cam member 73 will be rotated so as to spread the arms 67 and 68 and open up the scraper members 69 and 70.

While I have shown and described some preferred embodiments of my invention, it will be understood that it is not to be limited to all of the details shown, but is capable of modification and variation within the spirit of the invention and within the scope of the claims.

What I claim is:

1. Means for descaling a length of heated bar stock comprising a frame, a block mounted on the frame having an opening therethrough, means on the frame for feeding a length of stock through said opening, a plurality of supporting shank members pivoted in said block, each on an axis transverse to the axis of said opening and spaced circumferentially around the axis of the opening, a scraper member carried by each of said shank members, and means in the block urging said scrapers toward the axis of the opening.

2. Means for descaling a length of heated bar stock as set forth in claim 1 wherein the shank members are provided with guide flanges and the block is provided with grooves in which said flanges are guided.

3. A descaling device as in claim 1 wherein the block is provided with radially formed passages in which said shank members are mounted for radial movement with respect to said opening.

References Cited in the file of this patent

UNITED STATES PATENTS

| | | |
|---|---|---|
| 1,198,894 | Cote | Sept. 19, 1916 |
| 1,317,049 | Smith | Sept. 23, 1919 |
| 1,408,917 | Wilcox | Mar. 7, 1922 |
| 1,709,328 | Stover | Apr. 16, 1929 |
| 1,737,990 | Benson | Dec. 3, 1929 |
| 1,947,449 | Anderson | Feb. 20, 1934 |
| 1,977,162 | Wilcox | Oct. 16, 1934 |
| 2,003,084 | Kinney | May 28, 1935 |
| 2,057,527 | Johnson | Oct. 13, 1936 |
| 2,233,928 | Weaver | Mar. 4, 1941 |
| 2,242,024 | Dillon | May 13, 1941 |
| 2,338,687 | Johnson | Jan. 4, 1944 |
| 2,689,360 | Ware | Sept. 21, 1954 |
| 2,698,951 | Van Haandel | Jan. 11, 1955 |
| 2,702,937 | Smart | Mar. 1, 1955 |
| 2,727,298 | Crawford | Dec. 20, 1955 |